C. T. SCHROYER.
WARMER FOR STEERING WHEELS.
APPLICATION FILED MAY 23, 1914.

1,129,236.

Patented Feb. 23, 1915.

Witnesses
Robert M. Sutphen
A. J. Hind

Inventor
Charles T. Schroyer
By Watson E. Coleman
Attorney

UNITED STATES PATENT OFFICE.

CHARLES T. SCHROYER, OF SIOUX FALLS, SOUTH DAKOTA.

WARMER FOR STEERING-WHEELS.

1,129,236.  Specification of Letters Patent.  Patented Feb. 23, 1915.

Application filed May 23, 1914. Serial No. 840,555.

*To all whom it may concern:*

Be it known that I, CHARLES T. SCHROYER, a citizen of the United States, residing at Sioux Falls, in the county of Minnehaha and State of South Dakota, have invented certain new and useful Improvements in Warmers for Steering-Wheels, of which the following is a specification, reference being had to the accompanying drawings.

This invention relates to new and useful improvements in attachments for steering wheels and more particularly to steering wheels which are used upon automobiles, aeroplanes and the like, the main object of the invention being the provision of an attachment to a steering wheel which is provided with a heating medium for the purpose of furnishing a warmer for the hands during the cold periods of the year and is so arranged that the same may be readily attached to or detached from the steering wheel.

Another object of the present invention is the provision of an attachment of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

Figure 1:
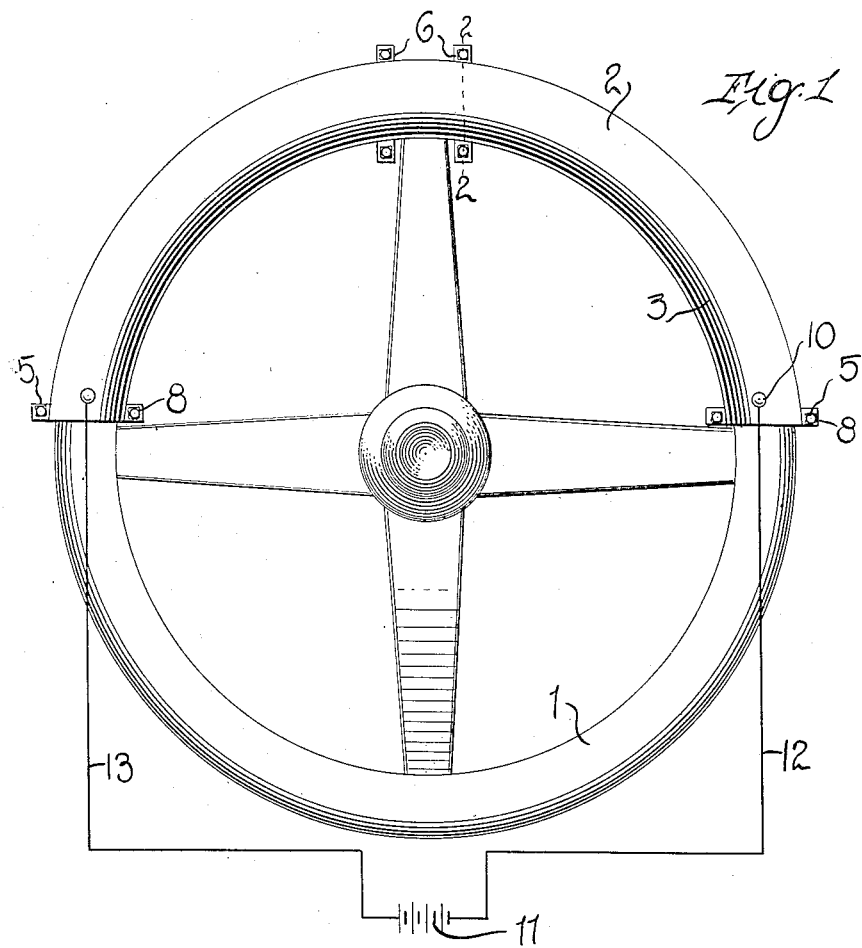
Figure 2:
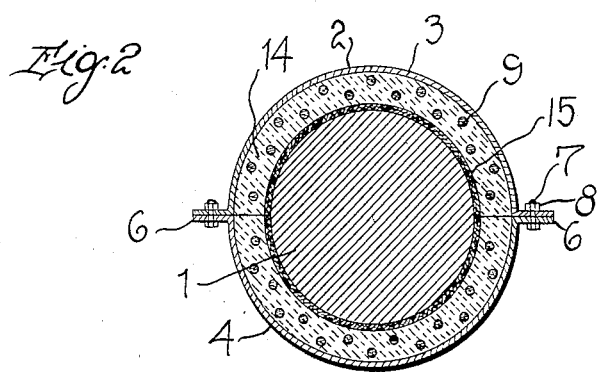

In the accompanying drawing forming a part of this application, Figure 1 is a top plan view of a warming device for steering wheels constructed in accordance with my invention and illustrating the same applied to the wheel; and Fig. 2 is a transverse sectional view taken on the line 2—2, of Fig. 1.

Referring more particularly to the drawing, 1 indicates a steering wheel which may be of any well known type and movably secured thereto is my improved warming device, which is illustrated as being applied to one-half of the steering wheel shown in Fig. 1. The attachment as applied is formed of an upper section 3 and a lower section 4, each section being substantially semi-circular transversely and adapted to be removably secured in confronting relation upon the steering wheel. Each section consists of an outer casing 2, of metal or other suitable material, semi-circular in cross section and arcuate in form, each casing member being provided at its ends with the perforated ears 5 adapted to be arranged upon opposite sides of the sections and also provided at their intermediate portions with the spaced perforated ears 6. From this it will be apparent that when the sections are applied on opposite sides of the steering wheel, the ears upon each of the sections are adapted to be arranged in alinement so that the two sections may be readily secured together by inserting bolts 7 therethrough and threading nuts 8 upon the ends of the bolts to securely hold the two sections in their effective positions.

It will be noted by reference to Fig. 1, that the semi-circular sections 3 and 4 are of such length as to extend the entire distance between two alined spokes of the steering wheel, and practically contact therewith, so that in turning the wheel, the sections will be positively held against slippage, and unnecessary strain will therefore be removed from the ears 5 and the bolts 7.

Within each of the casing members 2 is arranged the wires 9, these wires being connected at each end of the chamber formed by the casing member with a battery 11 through the medium of the wires 12 and 13. The wires 9 are set in a suitable matrix or core 14, this core being also semi-circular in cross section, and in order to prevent the steering wheel from becoming overheated I provide a lining 15 of asbestos on the inner face of each section and substantially on the inner face of the matrix or core 9.

From the above description taken in connection with the accompanying drawing, it will be readily apparent that I have provided a simple and durable device which can be quickly and easily applied to the outer rim of a steering wheel or removed therefrom. It will also be apparent that by forming the same of two detachable sections, it renders the device extremely simple in construction and can be manufactured and placed upon the market at a comparatively low cost. It will be understood that the wires 9 which are arranged within the casing can be connected to any source of supply but it is preferred to have the same connected to storage batteries which are carried by the vehicle and it will also be noted that while I have illustrated the device as applied to only one-half of the wheel, it can be readily applied to the entire circumference of the same.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claims.

Having thus described this invention, what I claim is:—

1. As an article of manufacture, a warming attachment for the steering wheels of automobiles, including opposed mating half sections adapted when placed together to extend transversely around the rim of the steering wheel, each of said sections comprising an outer casing arcuate in cross section, a core disposed within the casing, electrical heating wires passing through the core and adapted to be connected to a source of energy, an interior lining of non-conducting material, and means on the casing members for detachably holding the sections upon the wheel and drawing said sections toward each other.

2. The combination with an automobile steering wheel of a warming attachment including opposed mating sections semi-circular in cross section adapted when placed together to extend transversely around and close to the rim of the wheel, these sections comprising an outer casing, a core, electrical heating wires passing through the core and adapted to be connected to a source of electricity, and an inner non-conducting lining, the outer casing members being provided with outstanding lugs, and bolts passing through said lugs and drawing the sections toward each other and into firm engagement with the steering wheel.

3. The combination with a steering wheel having radiating spokes and a rim, of a hand warming attachment therefor comprising two arcuate sections, semi-circular in cross section, arranged in mated relation to extend transversely around the rim of the wheel, each section including a casing member, a core and electric wires extending through the core, a plurality of pairs of ears extending from each casing member, the ears of one casing member registering with like ears on the other member, and the ears of each pair being spaced apart, a distance slightly greater than the width of a spoke, bolts passing through the ears and engaging against the sides of the spokes to thereby hold the sections together, and an attachment for circular motion on the wheel.

In testimony whereof I hereunto affix my signature in the presence of two witnesses.

CHAS. T. SCHROYER.

Witnesses:
R. W. RONEY,
M. CHRISTENSEN.